United States Patent
Longazel

[11] Patent Number: 5,926,905
[45] Date of Patent: *Jul. 27, 1999

[54] RUMBLE STRIP FOR WINDSHIELD WIPER BLADE

[76] Inventor: Thomas W. Longazel, 127 Butler St., Ebensburg, Pa. 15931

[*] Notice: This patent is subject to a terminal disclaimer.

[21] Appl. No.: 08/726,851

[22] Filed: Oct. 4, 1996

Related U.S. Application Data

[60] Continuation-in-part of application No. 08/453,497, May 30, 1995, abandoned, which is a division of application No. 08/208,440, Mar. 9, 1994, Pat. No. 5,458,690.

[51] Int. Cl.⁶ ................................ B60S 1/04; B60S 1/62
[52] U.S. Cl. .................... 15/246; 15/250.19; 15/250.001
[58] Field of Search ................................ 15/257.01, 246, 15/250.19, 250.001, 236.02, 237, 238, 215, 250.16, 236.08, 112, 113, 250.42; 296/97.23

[56] References Cited

U.S. PATENT DOCUMENTS

| | | | |
|---|---|---|---|
| 2,974,340 | 3/1961 | Kopczynski | 15/250.001 |
| 3,390,912 | 7/1968 | Stata | 296/97.23 |
| 3,908,222 | 9/1975 | Scott | 15/250.19 |
| 4,378,484 | 3/1983 | Kunert | 15/250.19 |
| 4,685,168 | 8/1987 | Mastromoro | 15/250.19 |
| 4,934,013 | 6/1990 | Jacoby | 15/250.19 |
| 5,226,199 | 7/1993 | Jacoby | 15/250.19 |
| 5,513,412 | 5/1996 | Longazel | 15/250.19 |

FOREIGN PATENT DOCUMENTS

| | | | |
|---|---|---|---|
| 1911991 | 9/1970 | Germany | 15/250.001 |
| 1512327 | 6/1978 | United Kingdom | 15/250.19 |
| 2084451 | 9/1981 | United Kingdom . | |

*Primary Examiner*—Gary K. Graham
*Attorney, Agent, or Firm*—James Ray & Associates

[57] ABSTRACT

A rumble strip for removing snow and ice from a windshield wiper blade having an elongated body positioned at an edge of a windshield over which a windshield wiper blade will pass when activated, the elongated body having at least one surface sufficiently raised from the outer surface plane of the windshield as will cause the windshield wiper blade to be flexed and/or bumped as it passes thereover, whereby the flexing and/or bumping action will be sufficient to dislodge at least some of the snow and ice which has adhered to the windshield wiper blade.

1 Claim, 2 Drawing Sheets

RUMBLE STRIP FOR WINDSHIELD WIPER BLADE

This is a continuation of application Ser. No. 08/453,497, filed May 30, 1995, now abandoned, which was a Division Ser. No. 08/208,440, filed Mar. 9, 1994, now U.S. Pat. No. 5,458,960, issued Oct. 17, 1995.

FIELD OF THE INVENTION

This invention relates generally to the removal of snow and ice from a vehicle windshield wiper blade, and more particularly to a unique and novel rumble strip positioned on or adjacent to the windshield over which the windshield wiper blade will repeatedly pass in its windshield wiping action, or can be made to pass when the wiper switch is turned "on" or "off", such that the windshield wiper blade is caused to be flexed and/or bumped as it passes over the rumble strip to thereby loosen, dislodge and remove snow and/or ice adhering thereto.

BACKGROUND OF THE INVENTION

Practically all vehicle operators, including automobile and truck driver, as well as other vehicle operators, and particularly those who operate such vehicles in inclement winter weather, have experienced the problem of obstruction to adequate vision when the windshield wiper blades become coated or clogged with snow and ice. It is indeed well known that when operating a vehicle during inclement winter weather, and particularly at times during snow fall or freezing rain, that the windshield wiper blades will tend to become coated with packed show or ice making it very difficult for the windshield wiper blades to adequate clear the windshield. As a consequence, vision through the windshield becomes obstructed and hinders clear vision and safe driving. In such situation, it often becomes necessary for the vehicle operator to stop his vehicle periodically for the purpose of stepping out of the vehicle to dislodge and remove snow and ice accumulations from the windshield wiper blades before proceeding. This becomes necessary not only to satisfy the driver's own feeling of adequate vision and safe driving, but may be necessary from a legal point of view as many states have written regulations or laws regarding the area of windshield that must be cleared least the driver be in violation of such law or regulation. It is further recognized that the need to stop one's vehicle and step outside for the purpose of removing snow and ice from the windshield wiper blades can itself be very dangerous, as obviously, other following drivers will most likely have similar obstructed vision and may not see such a stopped vehicle or the driver standing adjacent thereto cleaning his or her windshield wiper blades.

SUMMARY OF THE INVENTION

This invention is predicated on my conception and development of a very simple piece of apparatus, namely a simple rumble strip which is merely an elongated body, which can be secured at an edge of the outer surface of a windshield at a position over which the windshield wiper blade will pass when in the operating mode, or when the wiper switch is turned "on" and "off". The rumble strip has at least one surface sufficiently raised from the outside plane surface of the windshield as will cause the windshield wiper blade to be flexed and/or bumped as it passes thereover. The flexing and/or bumping of the windshield wiper blade will loosen, dislodge and remove at least some of the snow and ice adhering to the windshield wiper blade. Accordingly, the repeated flexing and/or bumping of the windshield wiper blade with each and every pass over the rumble strip will serve to keep the windshield wiper blade relatively clear of accumulated packed snow and ice so that the windshield wiper blade can better function to keep the windshield cleared of vision obstructing water, snow and ice.

OBJECTS OF THE INVENTION

It is a primary object of this invention to provide a means and method for preventing an accumulation of snow and ice on a windshield wiper blade in amounts sufficient to hinder adequate wiping of the windshield.

It is another object of this invention to provide a means and method for removing snow and ice from a windshield wiper blade while such a wiper blade is in the operating mode wiping a windshield, or when the wiper switch is turned "on" and "off".

A further object of this invention is to provide a rumble strip securable on or adjacent to a windshield at a position over which a windshield wiper blade will pass during operation or can be made to pass, which will function to flex and/or bump the windshield wiper blade to thereby loosen, dislodge and remove snow and ice therefrom.

An additional object of this invention is to provide a rumble strip as a part of a windshield or frame adjacent to a windshield at a position over which a windshield wiper blade will pass during operation or can be made to pass, which will function to flex and/or bump the windshield wiper blade to thereby loosen, dislodge and remove snow and ice therefrom.

Still another object of this invention is to provide a method of removing snow and ice from a windshield wiper blade which does not require any driver involvement.

A still further object of this invention is to provide a method of preventing the accumulation of snow and ice on a windshield wiper blade which does not require any driver involvement.

DESCRIPTION OF THE PREFERRED EMBODIMENTS OF THE INVENTION

Figure 1:
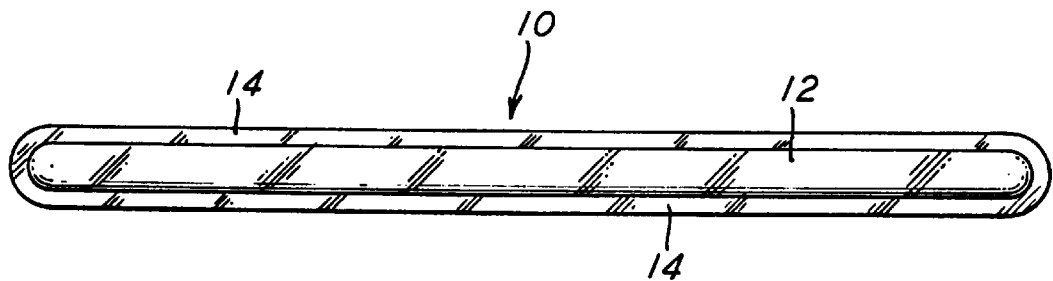
FIG. 1 is a plan view of a rumble strip in accordance with one embodiment of this invention.
Figure 2:
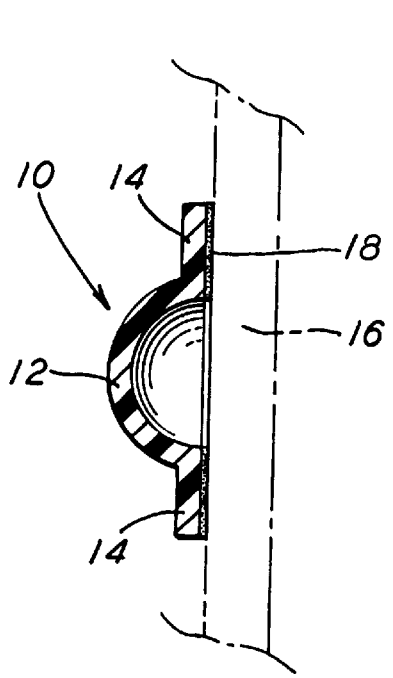
FIG. 2 is a sectional view of the rumble strip illustrated in FIG. 1 as positioned on the outside surface of a windshield.

Reference to FIGS. 1 and 2 will illustrate a relatively simple embodiment of this invention in which the inventive rumble strip, generally designated 10, comprises an elongated body having an elongated raised surface portion, or rib 12, and a flange portion 14 completely surrounding the raised surface portion, or rib 12. As shown in FIG. 2, the flange portion 14 is that portion intended to be secured to a windshield 16 as example an adhesive 18. This can be accomplished by any desired method, such as by applying a good weather-proof adhesive (not shown) to the outer surface of flange 14, and then pressing that outer surface of flange 14 against the windshield 16 at the selected location, and then permitting the adhesive to cure so that the rumble strip 10 will be secured in place. Since most windshields have a curved, convex outer surface, rumble strip 10 is preferably manufactured of a flexible material such as a plastic that can be flexed as necessary to be bonded to any such curved windshield. For purposes of minimizing any obstruction to vision through the windshield 16, the plastic material utilized should preferably be one that is transparent. In a like manner, the adhesive used should preferably be one that is transparent when cured.

Figure 3:
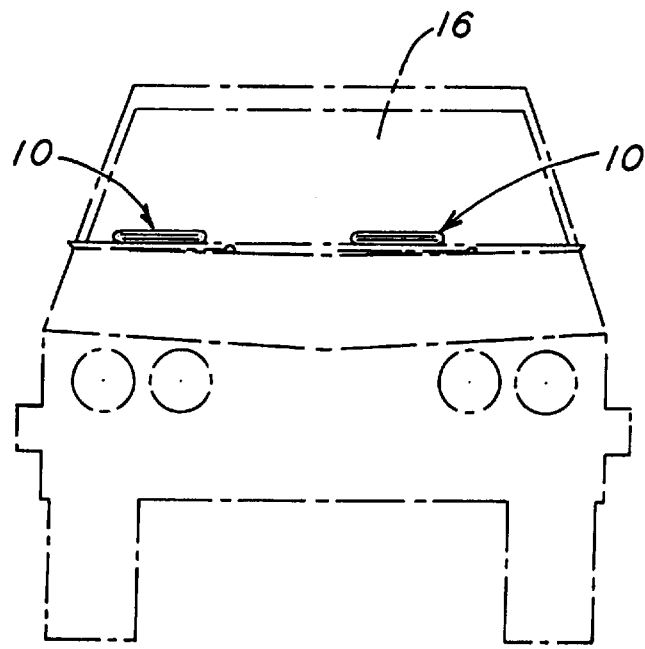
FIG. 3 is a schematic illustration of the front of an automobile illustrating normal proper placement of a pair of the inventive rumble strips as illustrated in FIGS. 1 and 2.

It is of course necessary that the rumble strip 10 be secured at a location on or adjacent to the windshield 16 where it will not itself obstruct the driver's vision through the windshield 16. As shown if FIG. 3, one ideal location is to position such a rumble strip 10 horizontally along the lower edge of the windshield 16, just upward from the windshield wiper blade's "at-rest" position, where it would not normally be in the line of vision of the roadway in front of the vehicle. The placement position shown in FIG. 3, of course, assumes that the vehicle is equipped with a more or less conventional windshield wiper placement, having two wiper posts (not shown) positioned under the lower edge of the windshield 16, and the "at-rest" position for the two windshield wiper blades is to the lower, right-hand side, immediately under rumble strips 10 as shown in FIG. 3. As is known, however, some vehicles have rather unusual windshield wiper arrangements, so that the ideal placement of such rumble strip or strips 10 will depend upon the particular wiper arrangement utilized, and the path over which the windshield wiper blade or blades move during the wiping action. Accordingly, the ideal position for a pair of rumble strips 10 will vary from one vehicle to the next, but in any event, should be one which does not obstruct the driver's view of the roadway, and over which the windshield wiper blade will pass with each swing of its windshield wiping action, or can be made to pass by turning the wiper switch on of off.

While some windshield wiper systems cause the windshield wiper blades to swing an arc whereby the wiper blades return to the "at-rest" position after each arc swing, others cause the wiper blades to swing an arc slightly displaced from the at-rest position. That is to say, the windshield wiper blades on the return swing stop short of the at-rest position, and return to the at-rest position only when the wiper switch is turned "off". With regard to the first-noted system, whereby the wiper blades return to the at-rest position with each swing, the wiper blades will necessarily pass over properly positioned rumble strips 10 with each swing of the wiper blades. With regard to the second-noted system, however, the windshield wiper blades may or may not pass over properly placed rumble strips 10 with each swing depending upon the specific placement of the rumble strips 10. If the rumble strips 10 are positioned within the back and forth arc through which the wiper blades pass, then the wiper blades will pass over the rumble strips 10 with each arc swing. However, if rumble strips 10 are positioned between the at-rest position and the arc return position, the wiper blades can be made to pass over the rumble strips 10 only by turning the wiper switch off and on. For the second-noted system, therefore, the vehicle owner will have an option with regard to how he or she prefers the subject invention to function; i.e., either a repeated flexing and/or bumping action with each arc swing of the windshield wiper blades, or selectively by turning the wiper switch off and on, so that the wiper blades will selectively return to the at-rest position thereby passing over the rumble strip or strips 10. This option may provide some advantages to some vehicle operators who most normally do not drive during snow fall or freezing rain conditions.

While FIG. 3 illustrates two such rumble strips 10 secured to windshield 16, one for each of two windshield wiper blades, obviously, a vehicle owner could choose to use only one without departing from the spirit of the invention. In addition, since the two rumble strips 10 will normally be positioned in a line, as illustrated in FIG. 3, it should be apparent that a single rumble strip having an overall length sufficient to span between the two windshield wiper blade paths could be utilized, so that one rumble strip 10 will serve both windshield wiper blades.

In view of the above, it should be apparent that the length of rumble strip 10 is not particularly critical, and could be long enough to span across the entire width of the windshield, provide ideally, that such an extra length rumble strip be positioned to assure that each windshield wiper blade will pass thereover as desired. In a like manner, there is no criticality to the minimum length of the rumble strip 10. While as a practical consideration, the length of the rumble strip 10 should be approximately equal to that of the associated windshield wiper blade, it should be apparent that rumble strips significantly shorter than the associated windshield wiper blade may still do a good job in keeping snow and ice from accumulating on a wiper blade as long as it is adequate to bump and/or flex the wiper blade as it passes thereover. In fact a rumble strip notably shorter than the windshield wiper blade may in fact do a better job of flexing the wiper blade to the extent that it would flex only a portion of the wiper blade upwards without so flexing other portions. Clearly, therefore, the length of rumble strip 10 is not particularly critical or important provided that it is sufficient to effect the essential flexing and/or bumping of the windshield wiper blade.

As shown in FIGS. 1 and 2, the elongated raised surface portion 12, is shown to be straight and have a uniform, half-circular cross-section throughout its entire length. It should be apparent, however, that other cross-sectional configurations would be suitable, and in some situations may even be preferred, depending upon the construction of the windshield wiper blade. In this regard, it should be noted that rumble strip 10 will have the ability to provide three separate and distinct functions, all of which will serve to remove any snow and ice adhering to the windshield wiper blade. Firstly, it should be noted that elongated raised portion 12 will provide a protruding "bump" over which the windshield wiper blade must pass which will serve to knock-off any snow and/or ice adhering thereto as the wiper blade impacts against the elongated raised portion 12, and again as windshield wiper blade impacts against the windshield when it moves down from raised portion 12. This repeated impacting of the windshield wiper blade as it is bounced over elongated raised portion 12 will serve to literally knock-off snow and ice with each such impact. Secondly, it should be noted that elongated raised surface portion 12 will further serve to laterally deflect and elastically flex the rubber wiping portion of the windshield wiper blade with each pass thereover to dislodge small portions of snow and ice adhering to such rubber wiping portion. And thirdly, elongated raised portion 12 will also cause a general flexing of the flexible frame member holding the rubber wiping portion of the wiper blade to dislodge snow and ice adhering to such a frame member. Accordingly, the first noted impacting action will normally remove snow and ice loosened and dislodged by the two flexing actions to cause the snow and ice to fall free of the windshield wiper blade entirely.

In considering the three above-noted modes of operation in which the rumble strip 10 functions in removing snow and ice from a windshield wiper blade, it should be apparent that different physical configurations of rumble strip 10, and in particular elongated raised surface portion 12, will have varying effects in removing snow and ice from the windshield wiper blade. For example, the elongated raised surface portion 12, being straight and of uniform cross-section as shown in FIGS. 1 and 2, is a configuration that would tend to enhance the bumping and impact action at the expense of the flexing actions, particularly if the rumble strip 10 were positioned so that the windshield wiper blade is parallel thereto as it passes thereover. On the other hand, a wavy, undulating configuration, or a row of single protruding bumps, may well tend to enhance the flexing action on the rubber portion of the windshield wiper blade without significantly sacrificing the bumping impact action. As a third possibility, an elongated raised surface portion 12 comprising just a pair of such raised surface portions positioned to raise only the ends, or only the mid-section, of the windshield wiper blade, would tend to enhance the flexing action on the frame of windshield wiper blade. Which of these three actions would in fact be preferred would depend primarily on the particular weather conditions involved, so that no one single configuration would be ideal for all conditions.

As already suggested above, the actual placement of the rumble strip 10 with respect to the windshield wiper blade can be varied somewhat to vary the resulting effect. Specifically, if rumble strip 10, is positioned to be parallel to the windshield wiper blade as it passes thereover, it is apparent that the entire length of the windshield wiper blade will pass thereover at the same moment with a bouncing impact action. On the other hand, if rumble strip 10 were to be secured to a windshield at an angle to the windshield wiper blade, then the wiper blade would pass thereover at an angle proceeding from one end of the wiper blade to the other, thereby flexing the windshield wiper blade, and particularly the rubber portion from one end to the other. Clearly, therefore, one has options as to the proper placement of the rumble strip 10, which in some situations need not be on a windshield itself. Specifically, some vehicles have a frame member which contains and encircles the windshield, as least with regard to some of the windshield edges. If the windshield wiper blade passes over such a frame member during the wiping action, or can be adjusted to do so, then the rumble strip 10 can be secured to the surface of such a frame member, which will assure that it is not in a position that will obstruct the driver's vision through the windshield.

Figure 4:
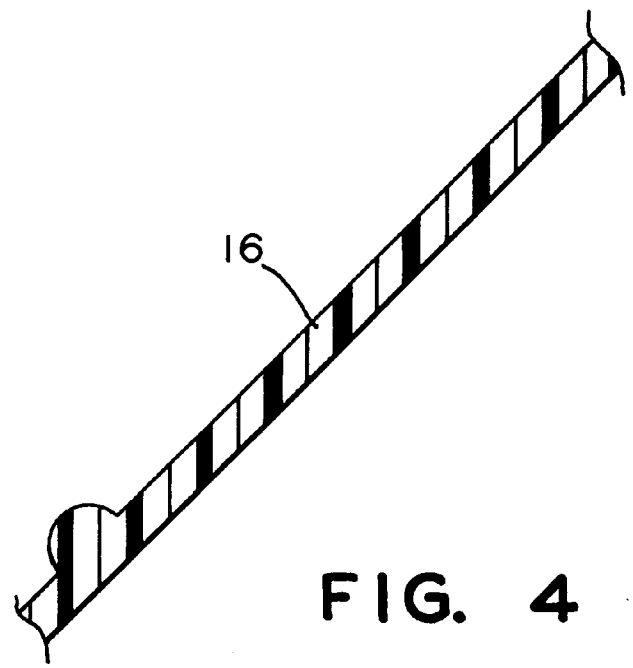
FIG. 4 is a cross-sectional view through a lower portion of a windshield showing the inventive rumble strip incorporated directly into the windshield itself as by molding or casting.
Figure 5:
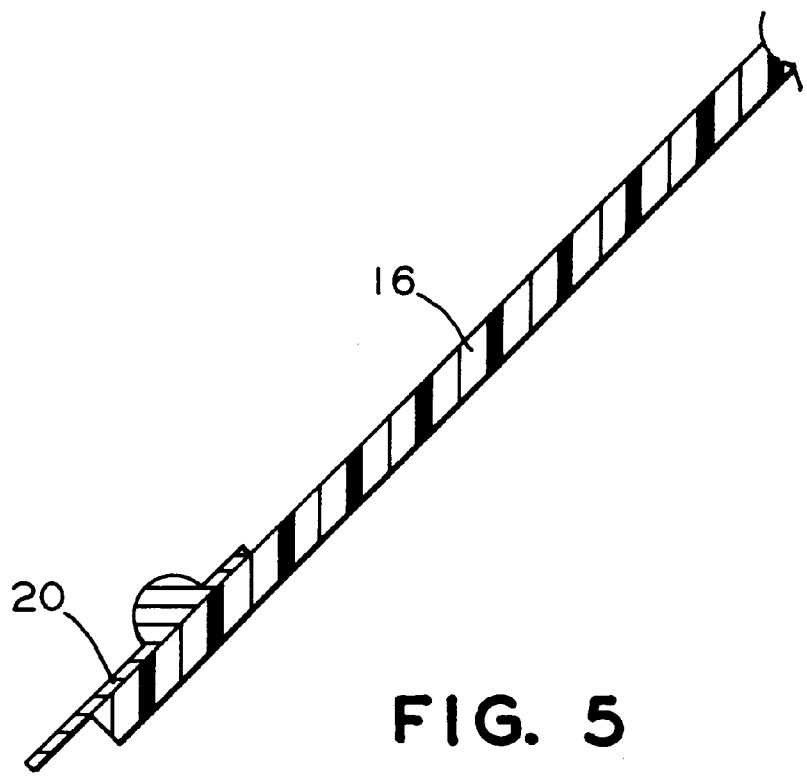
FIG. 5 is a cross-sectional view like that of FIG. 4 but showing the inventive rumble strip incorporated directly into a windshield frame member which holds the windshield onto the vehicle.

While the above discussions have focused on the installation of an inventive rumble strip 10 on an existing vehicle, it should be obvious that vehicle manufactures can manufacture such a rumble strip directly into any vehicle. While such manufactures could utilize an adhesive to bond an independent rumble strip 10 to a windshield as described above, they would also have the option of manufacturing a rumble strip directly into a windshield 16 or a frame member 20 or the like adjacent to a windshield as depicted in FIGS. 4 and 5. Obviously, such a rumble strip build directly into a component of the vehicle would not necessarily require means, such as flange portion 14, for securing the rumble strip to or adjacent to a windshield. For example, such a rumble strip could comprise a simple raised portion manufactured directly into the glass windshield itself, or manufactured directly into a frame member adjacent to the windshield. In either situation, the manufacturer could design the windshield wiper action to assure that the windshield wiper blade or blades pass over such a raised portion during the wiping action.

While just one embodiment of the invention has been illustrated and several described, it should be apparent from the above discussion that a great number of other embodiments and modifications could be utilized without departing from the spirit of the invention. In addition to the many possible forms such a rumble strip could have, it should be further apparent that the use thereof could be varied significantly, such as providing two or more such rumble strips for each windshield wiper blade. By utilizing such a plurality of rumble strips, different configurations or placements could be incorporated into each so that each will have a particular function; e.g., one which will primarily provide a significant bumping action, and another which will primarily provide a significant flexing action. Clearly, a great number of other embodiments and modifications could be incorporated.

I claim:

1. Apparatus for use in removing snow and ice from a windshield wiper blade adapted to wipe a portion of an outside surface of a windshield, said apparatus comprising: an elongated strip of transparent plastic material of sufficient flexibility to permit its attachment to a curved windshield, said elongated strip of material securable at an edge of such outside surface of such windshield at a position over which such windshield wiper blade will pass when activated, said strip of material having an elongated flange member for attaching it to a windshield with adhesive and an elongated and rounded raised rib portion having a smooth, half-cylindrical outer surface portion centrally disposed over said elongated flange member and sufficiently raised therefrom as to cause such windshield wiper blade to be flexed and bumped as it passes thereover sufficient to dislodge and remove snow and ice adhering to such windshield wiper blade.

* * * * *